United States Patent
Backer et al.

(10) Patent No.: US 7,814,568 B2
(45) Date of Patent: Oct. 19, 2010

(54) PROCESS FOR PRODUCING FLEXIBLE PANELS COMPRISING LAMINATES OF UNIDIRECTIONALLY ARRANGED POLYMERIC TAPES

(75) Inventors: Jan Adolph Dam Backer, Son en Breugel (NL); Bart Clemens Kranz, Uden (NL)

(73) Assignee: Novameer B.V., Veghel (NL)

( * ) Notice: Subject to any disclaimer, the term of this patent is extended or adjusted under 35 U.S.C. 154(b) by 0 days.

(21) Appl. No.: 12/311,316

(22) PCT Filed: Sep. 29, 2007

(86) PCT No.: PCT/EP2007/008500

§ 371 (c)(1),
(2), (4) Date: Mar. 26, 2009

(87) PCT Pub. No.: WO2008/040511

PCT Pub. Date: Apr. 10, 2008

(65) Prior Publication Data

US 2009/0265826 A1    Oct. 29, 2009

(30) Foreign Application Priority Data

Oct. 5, 2006    (EP)    ................... 06020902

(51) Int. Cl.
*F41H 1/02* (2006.01)
*F41H 5/04* (2006.01)
*F41H 1/00* (2006.01)
(52) U.S. Cl. .......................................... 2/2.5; 428/911
(58) Field of Classification Search ...................... 2/2.5
See application file for complete search history.

(56) References Cited

U.S. PATENT DOCUMENTS

| 4,953,234 | A | * | 9/1990 | Li et al. ......................... 2/412 |
| 5,185,195 | A | * | 2/1993 | Harpell et al. ............... 428/102 |
| 5,578,370 | A |   | 11/1996 | Ferrar et al. |
| 6,127,291 | A | * | 10/2000 | Coppage et al. ............. 442/135 |
| 6,786,126 | B2 | * | 9/2004 | Sargent ..................... 89/36.02 |

FOREIGN PATENT DOCUMENTS

GB    1 387 701    3/1975

* cited by examiner

*Primary Examiner*—Bobby H Muromoto, Jr.
(74) *Attorney, Agent, or Firm*—Oliff & Berridge, PLC

(57) ABSTRACT

A flexible panel including a plurality of individual laminates, the laminates being built of at least two monolayers of unidirectionally arranged polymeric tapes bonded together, the direction of the polymeric tapes being the same in every monolayer and the polymeric tapes of each monolayer are offset to the tapes of the adjoining monolayer, wherein the laminates are stacked on top of each other and secured to each other by separated bonding points or bonding lines.

9 Claims, No Drawings

PROCESS FOR PRODUCING FLEXIBLE PANELS COMPRISING LAMINATES OF UNIDIRECTIONALLY ARRANGED POLYMERIC TAPES

The present invention is a national stage entry of PCT/EP2007/008500 filed Sept. 29, 2007 and claims priority to European Patent 06020902.0 filed Oct. 05, 2006.

The present invention relates to flexible panels comprising laminates, the laminates being built of at least two monolayers of unidirectionally arranged polymeric tapes and a process for producing said panels. The flexible panels according to the invention may be used for antiballistic clothing.

Antiballistic clothing may comprise rigid plates e.g. metal, ceramic or polymeric plates as inserts in antiballistic protective vests. With this type of clothing it cannot be guaranteed that the wearer will have the freedom of movement necessary in a duty situation. Besides their relatively heavy weight, the fact that the vest inserts lack flexibility makes them a great deal less comfortable to wear.

As an alternative there is antiballistic protective clothing consisting of multiple layers of flat textile structures. Very often aramide fiber fabrics are used in the individual protective layers of the antiballistic clothing. In addition woven fabrics and other textile flat structures made from high tenacity polyethylene fibers have been suggested for use in antiballistic clothing. Such clothing is also referred to as "soft ballistic" and it aims to decrease the weight of the body armour while enhancing wear comfort and maintaining or even enhancing impact performance It is an object of the present invention to provide a flexible panel and a process for producing a flexible panel for use in soft antiballistic applications that meets the current aim to decrease the weight of body armour while enhancing wear comfort and maintaining or even enhancing impact performance.

This object is achieved by a flexible panel comprising a plurality of individual laminates, the laminates being built of at least two monolayers of polymeric tapes bonded together, the direction of the polymeric tapes being the same in every monolayer and the polymeric tapes of each monolayer are offset to the tapes of the adjoining monolayer, characterised in that the laminates are stacked on top of each other and secured to each other by separated bonding points or bonding lines.

The object of the present invention is also achieved by a process for producing a flexible panel comprising a plurality of individual laminates, the laminates being built of at least two monolayers of polymeric tapes bonded together, the direction of the polymeric tapes being the same in every monolayer and the polymeric tapes of each monolayer are offset to the tapes of the adjoining monolayer, characterised in that the laminates are being stacked on top of another and being secured to each other by separated bonding points or bonding lines.

Due to the separated bonding points or bonding lines the panel will remain very flexible as opposed to panels being bonded over the whole surface area. The panels take up the impact energy to which they are subjected with a high level of energy absorption.

The bonding points or bonding lines may be located at the edges of the panel. Preferably the bonding points or bonding lines are located in the middle of the panel. It is, however, more preferred that the bonding points or lines that secure the stacked laminates to each other are not aligned in adjacent laminates. The location of the bonding points or lines of two laminates are therefore offset to the bonding points or lines of those laminates adjacent the two laminates. Thus, a highly flexible panel can be obtained that, when it is subjected to bending, shows reduced crinkling of those laminates subjected to the smaller, i.e. the inner bending radius. In a preferred embodiment of the panel according to the invention the laminates are secured to adjacent laminates in an alternating manner of bonding points or lines in the middle of the laminate and at the edges of the laminate.

The laminates may be secured to each other by a thread e.g. by sewing or knitting.

As an alternative the laminates may be secured to each other by rivets, preferably rivets made from a polymeric material.

The laminates may also be secured to each other by a welded joint. Welding may be carried out by ultrasonic welding or laser welding.

The panel according to the present invention may be used as insert in antiballistic protective vests. It is however preferred that the panels are in such a shape so that formfitting soft body armour i.e. soft antiballistic vests may be formed from the panels.

In outer appearance, the body armour can be fashioned after body armours of the prior art, e.g. in the form of a vest or a jacket.

The individual laminates that are comprised within the panels according to the invention may have a thickness between 10 μm and 1500 μm, preferably between 50 μm and 1500 μm, more preferably between 50 μm and 1000 μm, and most preferably between 50 μm and 500 μm.

In a preferred embodiment the panels comprises at least 2, preferably at least 4 individual laminates that are stacked on top of each other, more preferably at least 10 individual laminates and most preferably at least 50 individual laminates. The panel according to the invention may comprise 100 or up to 500 individual laminates.

In the prior art polymeric tapes have only been used for rigid ballistic materials so called hard ballistic applications. For instance U.S. Pat. No. 5,578,370 discloses an impact resistant panel suitable for antiballistic protection. Such a panel is formed of a stack of two or more superimposed mats of intersecting elongate elements. The stack of two or more superimposed mats is consolidated by heating the stack to form a multilayered sheet, i.e. a panel.

The tapes building the laminates that are comprised within the panels are arranged in a parallel, i.e. side by side relationship and the direction of the tapes is the same in every monolayer. The monolayers of the laminates are not cross-plied at an angle with respect to each other. The number of tapes per monolayer may be e.g. up to 10, up to 100, up to 1000 but also up to 10.000 or more. The monolayers are so stacked that the tapes of each layer are offset to the tapes of the adjoining monolayer above or below that layer. Thus, the joints between adjacent tapes of one monolayer are covered by the tapes of the adjoining monolayer above or below that layer. The tapes may be arranged parallel to each other with each polymeric tape of one monolayer having an overlap with the polymeric tape that is positioned adjacent thereto.

The polymeric tapes used in the process according to the invention may be spun monofilaments. The term monofilament as used herein encompasses any single filament spun individually, e.g. by melt spinning or gel spinning.

Tapes could also be made in a solid state extrusion (SSE) or skived from solid material followed by post drawing.

The polymeric tapes used in the process according to the invention may also be prepared by cutting or slitting a polymer film. The polymer film may be calendered, drawn or even overdrawn to achieve the necessary tensile strength.

The laminates may be produced by forming a first monolayer of polymeric tapes by pre-tensioning the polymeric tapes and subsequently positioning the polymeric tapes under tension in a unidirectional, parallel manner, forming at least a second monolayer over the first monolayer in the same manner the first monolayer is formed, thereby—stacking the at least two monolayers of polymeric tapes in such a way that the direction of the polymeric tapes is the same in every monolayer and that the polymeric tapes of each monolayer are offset to the tapes of the adjoining monolayer above or below that monolayer and consolidating the thus stacked monolayers of polymeric tapes to obtain a laminate.

It should be noted that the laminate may comprise more than 2, e.g. 3, 4 or up to 25, even up to 50 or up to 100 monolayers of polymeric tapes all stacked in such a way that the direction of the polymeric tapes is the same in every monolayer and that the polymeric tapes of each monolayer are offset to the tapes of the adjoining monolayer above or below that monolayer.

Consolidation of the stacked monolayers that form the laminate is carried out in a manner known to the person skilled in the art preferably by applying pressure and heat to the stacked monolayers, e.g. by thermocalendering.

It is preferred that the tapes used for a process according to the present invention have a tensile strength of at least 200 MPa, more preferably the polymeric tapes have a tensile strength of at least 400 MPa. Depending on the polymeric material and the draw ratio the polymeric tapes may exhibit a tensile strength of at least 800 MPa and up to 20 GPa.

The tensile strength of the polymeric tapes is measured in accordance with ASTM D638.

The tapes may be selected from the group consisting of polyethylene, ultra high molecular weight polyethylene, polypropylene, polyamide, polybutadiene terephthalate and polyethylene terephthalate, polyethylene naphtalate, polyvinyl alcohol, polyphenylidensulfide, copolymers of these polymers and mixtures thereof.

Preferably the tapes are meltbonded with a thermoplastic resin material. This material may be applied to the tapes after forming the tape, it may be melt spun with the tapes as sheath material or it may be applied to a polymeric film before slitting it into tapes. Another possibility of applying the thermoplastic resin material is that a substrate layer of the resin material is placed between the monolayers building the laminate. Suitable resin material may be selected from the group consisting of polyethylene, ultra high molecular weight polyethylene, polypropylene, polyamide, polybutadiene terephthalate and polyethylene terephthalate, polyethylene naphtalate, polyvinyl alcohol, polyphenylidensulfide, copolymers of these polymers and mixtures thereof. In addition ethylene alkyl acrylate copolymer (EAA), ethylene vinyl acetate copolymer (EVA), ethylene-butyl acrylate copolymer (EBA), ethylenemethyl acrylate copolymer (EMA), linear low density polyethylene (LLDPE), high density polyethylenes (HDPE), low density polyethylenes (LPDE) may be used. It is also possible to use polyisobutylene (PIB) or polyurethane (PU) as sheath material. These polymers can be very flexible and may show high elongation. The thermoplastic resin material may comprise one of the listed materials or mixtures of those materials.

Before applying the thermoplastic resin material onto the polymeric tapes a primer may be applied on the tape surface as an adhesion promoter. Such a surface treatment enhances bonding between tape and thermoplastic resin material. A suitable primer may be e.g. chlorinated polypropylene. An additional effect of a primer is less fibrillating of the tapes in the subsequent processing steps. Other surface treatments that can be used to enhance bonding include plasma or corona treatment.

As an alternative to meltbonding the polymeric tapes forming the at least two monolayers of the individual laminates may also be bonded by a pressure sensitive adhesive.

Polymeric tapes comprising only one polymeric material may also be consolidated without any additional resin material or adhesive. The monolayers are in this case consolidated at a temperature range just below the melting temperature of the polymeric tapes. Such a method is known in the art as "hot compaction".

The term tape as used in the context of the present invention means flexible, elongate elements of essentially uniform width and thickness that can have any shape except a circular shape. The width/height ratio of the tapes is at least 2, preferably at least 5 and more preferably at least 20. Said tapes can be positioned in a side by side relationship with lateral sides of adjacent tapes being essentially parallel. The tapes may be derived from a slit film. The tapes may also be monofilaments. The tapes used in the process according to the present invention may have various cross sections e.g. quadrangular cross section or triangular cross section.

In order to obtain laminates with the required tensile strength it is preferred that the polymeric tapes are drawn with a draw ratio of at least 1:5, more preferably the polymeric tapes are drawn with a draw ratio of at least 1:15. Draw ratios of 1:50 or more are especially preferred.

Quadrangular tapes that are monofilaments may preferably be 1.5 mm to 10 mm in width and 20 μm to 1500 μm thick. Quadrangular tapes made by slitting a film may be 2 mm to 300 mm wide and 1 μm to 1000 μm, preferably 4 μm to 50 μm thick. Tapes with triangular cross section may be 2 to 10 mm in width and thickness.

The laminates used for the panels or for the process for producing a panel may be placed on top of another in such a way that the polymeric tapes building the laminates all lie in the same direction. In a preferred embodiment at least one of the laminates placed on top of another is turned relative to the adjoining laminate placed above or below that laminate, more preferably at least one of the laminates is turned by 90° relative to the adjoining laminate placed above or below that laminate thus obtaining higher tensile strength in transverse direction of the panel. The laminates may also be stacked in an alternating manner of o0° and 90°. The panel may comprise an identical number of laminates with 0° and turned by 90°. It is, however, also sufficient if only the top and bottom laminate are being turned by 90° relative to the other laminates.

Yet another object of the present invention is to provide a special use of such a panel.

The panels according to the present invention may be used to form airbags.

As indicated the panels according to the present invention are especially suited for antiballistic protective clothing. The panels may be used in soft body armour applications also called soft ballistics.

In order to prevent the so called traumatic effect it is in particular preferable if the present panel is provided with a shock absorber on the body side of the body armour.

The panels according to the present invention may also be provided with one or more stab resistant layers or laminates. The stab resistant layers or laminates may be provided on one or on both surface sides. The stab resistant layers or laminates may also be sandwiched between individual laminates even in an alternating manner of laminates according to the invention and stab resistant layers or laminates.

The panels according to the present invention may also be provided with one or more layers of aramid fibers or ultrahigh molecular weight polyethylene. These layers enhance the antiballistic performance of the panel and they may be provided on one or on both surface sides. The layers of aramid fibers or ultrahigh molecular weight polyethylene may also be sandwiched between individual laminates even in an alternating manner of laminates according to the invention and layers of aramid fibers or ultrahigh molecular weight polyethylene. Aramid layers are preferably sandwiched between individual laminates to prevent fraying of the aramid fibers.

The invention claimed is:

1. A flexible panel comprising a plurality of individual laminates, each of the plurality of individual laminates being built of at least two monolayers of unidirectionally arranged polymeric tapes bonded together, a direction of a plurality of monofilaments of the polymeric tapes being the same in every monolayer and the polymeric tapes of each monolayer being offset to the tapes of the adjoining monolayer, wherein the laminates are stacked on top of each other and secured to each other by separated bonding points or bonding lines.

2. A panel according to claim 1, wherein the laminates are secured to each other by a thread.

3. A panel according to claim 1, wherein the laminates are secured to each other by rivets.

4. A panel according to claim 1, wherein the laminates are secured to each other by a welded joint.

5. A panel according to claim 1, wherein the panel is provided with one or more layers of aramid fibers.

6. A panel according to claim 1, wherein the panel is provided with one or more layers of ultrahigh molecular weight polyethylene.

7. Antiballistic protective clothing, comprising at least one flexible panel according to claim 1.

8. A panel according to claim 1, wherein each monolayer is comprised of a plurality of the polymeric tapes arranged side by side, adjoining side by side polymeric tapes being connected at joints.

9. A panel according to claim 8, wherein the joints of one monolayer are offset from the joints of another monolayer stacked upon the one monolayer.

* * * * *

UNITED STATES PATENT AND TRADEMARK OFFICE
CERTIFICATE OF CORRECTION

| | |
|---|---|
| PATENT NO. | : 7,814,568 B2 |
| APPLICATION NO. | : 12/311316 |
| DATED | : October 19, 2010 |
| INVENTOR(S) | : Jan Adolph Dam Backer et al. |

It is certified that error appears in the above-identified patent and that said Letters Patent is hereby corrected as shown below:

Column 4, line 45, "o0°" should be --0°--.

Signed and Sealed this
Fourteenth Day of June, 2011

David J. Kappos
*Director of the United States Patent and Trademark Office*